US010510352B2

(12) United States Patent
Bhimanaik et al.

(10) Patent No.: US 10,510,352 B2
(45) Date of Patent: *Dec. 17, 2019

(54) DETECTING REPLAY ATTACKS IN VOICE-BASED AUTHENTICATION

(71) Applicant: Amazon Technologies, Inc., Seattle, WA (US)

(72) Inventors: Bharath Kumar Bhimanaik, Sammamish, WA (US); Daniel Wade Hitchcock, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/129,081

(22) Filed: Sep. 12, 2018

(65) Prior Publication Data

US 2019/0013033 A1  Jan. 10, 2019

Related U.S. Application Data

(63) Continuation of application No. 15/241,900, filed on Aug. 19, 2016, now Pat. No. 10,079,024.

(51) Int. Cl.
| | | |
|---|---|---|
| *G10L 17/00* | (2013.01) | |
| *G10L 19/018* | (2013.01) | |
| *G10L 17/02* | (2013.01) | |
| *G10L 17/06* | (2013.01) | |
| *G10L 25/51* | (2013.01) | |
| *G10L 15/08* | (2006.01) | |

(52) U.S. Cl.
CPC ............ *G10L 19/018* (2013.01); *G10L 17/02* (2013.01); *G10L 17/06* (2013.01); *G10L 25/51* (2013.01); *G10L 2015/088* (2013.01)

(58) Field of Classification Search
USPC .......................................................... 704/250
See application file for complete search history.

(56) References Cited

U.S. PATENT DOCUMENTS

| | | | |
|---|---|---|---|
| 6,480,825 B1 | 11/2002 | Sharma et al. | |
| 8,676,273 B1 * | 3/2014 | Fujisaki ............. | H04M 1/6505 455/567 |
| 8,812,319 B2 | 8/2014 | Skerpac | |
| 8,818,334 B2 | 8/2014 | Hoh et al. | |
| 9,014,661 B2 * | 4/2015 | deCharms ............. | H04W 4/021 455/404.2 |
| 9,286,899 B1 | 3/2016 | Narayanan | |
| 9,299,350 B1 | 3/2016 | Dumont et al. | |
| 9,548,053 B1 | 1/2017 | Basye et al. | |
| 9,820,120 B2 * | 11/2017 | deCharms ............. | H04W 4/021 |

(Continued)

OTHER PUBLICATIONS

U.S. Appl. No. 141658,276, entitled "Verifying Authenticity of Machine-Readable Identifiers," and filed Mar. 16, 2015.

*Primary Examiner* — Satwant K Singh
(74) *Attorney, Agent, or Firm* — Thomas | Horstemeyer, LLP

(57) ABSTRACT

Disclosed are various embodiments for detecting replay attacks in voice-based authentication systems. In one embodiment, audio is captured via an audio input device. It is then verified that the audio includes a voice authentication factor spoken by a user. The audio is then compared with stored audio spoken by the user. If it is determined that an exact copy of the voice authentication factor is in the stored audio, one or more actions may be performed.

20 Claims, 6 Drawing Sheets

(56) References Cited

U.S. PATENT DOCUMENTS

| | | | |
|---|---|---|---|
| 10,079,024 B1* | 9/2018 | Bhimanaik | G10L 25/51 |
| 2004/0139324 A1 | 7/2004 | Shin et al. | |
| 2006/0224888 A1 | 10/2006 | Mansz et al. | |
| 2015/0170665 A1 | 6/2015 | Gundeti et al. | |
| 2015/0358333 A1* | 12/2015 | Cronin | H04L 63/0861 |
| | | | 726/7 |
| 2016/0042748 A1 | 2/2016 | Jain et al. | |
| 2018/0137267 A1* | 5/2018 | Krieger | G06F 21/316 |
| 2019/0182261 A1* | 6/2019 | Carbune | G06F 3/167 |

* cited by examiner

DETECTING REPLAY ATTACKS IN VOICE-BASED AUTHENTICATION

CROSS-REFERENCE TO RELATED APPLICATIONS

This application is a continuation of, and claims priority to, co-pending U.S. patent application entitled "DETECTING REPLAY ATTACKS IN VOICE-BASED AUTHENTICATION," filed on Aug. 19, 2016, and assigned application Ser. No. 15/241,900, which is incorporated herein by reference in its entirety.

BACKGROUND

Authentication using biometric factors is increasingly being deployed to enhance security and provide for ease-of-use. For example, mobile devices are now often unlocked through the use of fingerprint recognition and/or face recognition. It may be easier and faster to press a fingerprint sensor or to look into a camera instead of entering a password or numerical code. Further, the number of potential variations of faces and fingerprints may provide greater entropy than a short password or numerical code.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to voice-based authentication, and specifically, to avoiding replay-based attacks in voice-based authentication. With various forms of biometric authentication, replay attacks can be a problem. For example, an attacker may fool a facial recognition system by displaying a picture or video of the victim in front of a camera. Similarly, an attacker may attempt to replicate the fingerprints of a victim from a copy. With voice-based authentication, an attacker may simply record the voice of the victim and then replay the recording to a microphone of a voice-based authentication system.

Various embodiments of the present disclosure introduce approaches for detecting replay attacks in voice-based authentication through the use of a coordinating speaker in addition to a microphone that records a user's voice. When a legitimate user speaks into a microphone to authenticate, the coordinating speaker may emit audible or non-audible sounds at the same time. When an attacker records the victim's voice when the victim speaks for authentication, the attacker would likely also record the sounds emitted by the coordinating speaker. When the attacker later attempts to replay the recording, the voice-based authentication system can detect the emitted sounds of the speaker in the recording, which serves as a "watermark" indicating that the victim's voice is prerecorded.

Figure 1A:
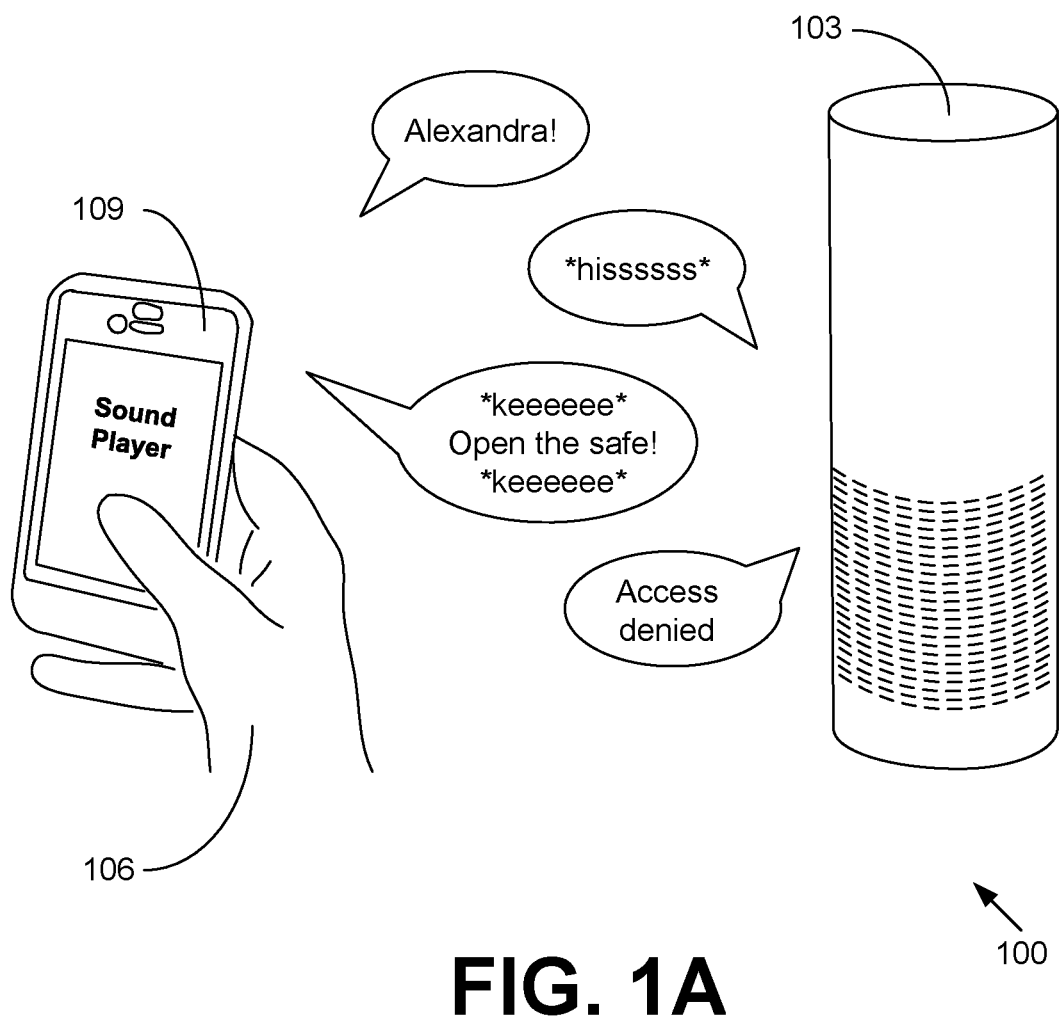
FIGS. 1A and 1B are drawings of example scenarios involving a replay attack on a voice-based authentication system according to various embodiments of the present disclosure.

Referring now to FIG. 1A, shown is a drawing of an example scenario 100 involving an attempted replay attack to circumvent voice-based authentication. The voice interface device 103, which includes both a microphone and a speaker, can be used to perform activities that require authentication. As an example, a user may speak into the voice interface device 103 to purchase a movie from an online streaming service. As another example, a user may speak into the voice interface device 103 to perform a home automation function. The actions enabled through commands to the voice interface device 103 may involve financial transactions, parental controls, and secured resources. Accordingly, when a user speaks a command to the voice interface device 103, the systems underlying the voice interface device 103 may perform voice recognition and speaker identification on the voice command to confirm that the speaker is authorized to give the command.

As shown in the example of FIG. 1A, a malicious user 106 is using an audio player on a mobile device 109 to replay a voice command given by an authorized user who was surreptitiously recorded. The recording begins with a wake word, "Alexandra!" The voice interface device 103 listens for this wake word, and upon hearing it, begins emitting a current watermark signal. In FIG. 1A, the current watermark signal is represented by "*hissssss*." Concurrently, the recording plays the voice command, "open the safe!" However, along with the voice command, the recording includes a previous watermark signal represented by "*keeeeee*."

Thus, in addition to the voice command of "open the safe!," the microphone of the voice interface device 103 captures a combination of the current watermark signal and the previous watermark signal. As will be discussed, the system can extract the previous watermark signal from the audio and recognize that it was previously presented. This confirms that the voice command is a replay of a recording. Consequently, authentication can be rejected, and the requested action is not performed.

Figure 1B:
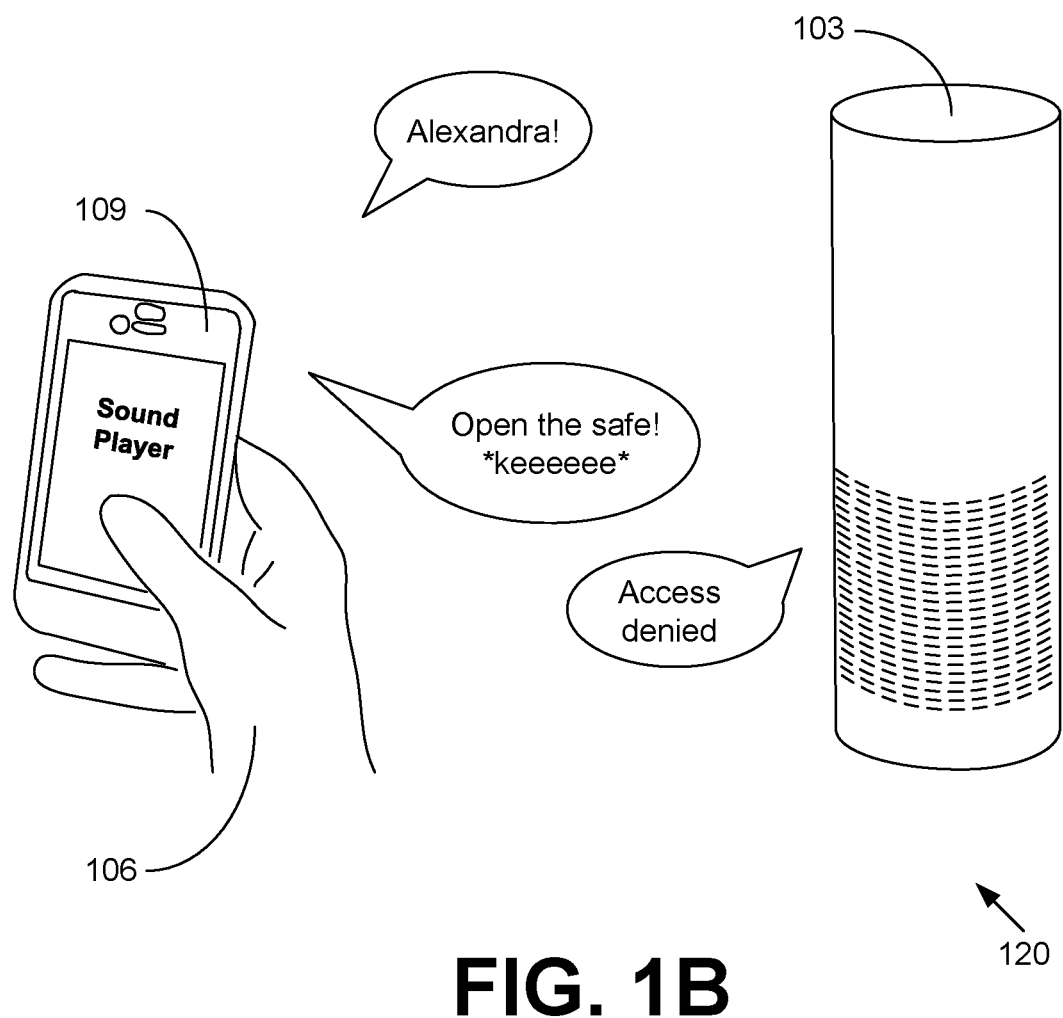

Moving on to FIG. 1B, shown is another drawing of an example scenario 120 involving an attempted replay attack to circumvent voice-based authentication. In the example scenario 120, relative to speaking a voice command, users employ an authentication watermark signal generated by another computing device, such as a smartphone, a tablet, a smartwatch, or another type of device. The authentication watermark signal acts as another authentication factor. For example, the device may be configured to generate the watermark signal only after the user has entered a valid numerical code or provided a valid fingerprint.

In the replay attack shown in the example scenario 120, a malicious user 106 is using an audio player on a mobile device 109 to replay a voice command and a previous watermark signal given by an authorized user who was surreptitiously recorded. The recording begins with a wake word, "Alexandra!" and then plays the voice command, "open the safe!" Along with the voice command, the recording includes a previous watermark signal represented by "*keeeeee*." Unlike the embodiment of FIG. 1A, some watermark signal should be presented by the malicious user as an additional authentication factor. However, the watermark signal of "*keeeeee*" is a previous watermark signal that is not the correct watermark signal currently expected by the voice interface device 103. For example, the voice interface device 103 may be expecting to detect a current watermark signal of "*hissssss*." Accordingly, authentication can be rejected, and the requested action is not performed. In the following discussion, a general description of the system and its components is provided, followed by a discussion of the operation of the same.

Figure 2:
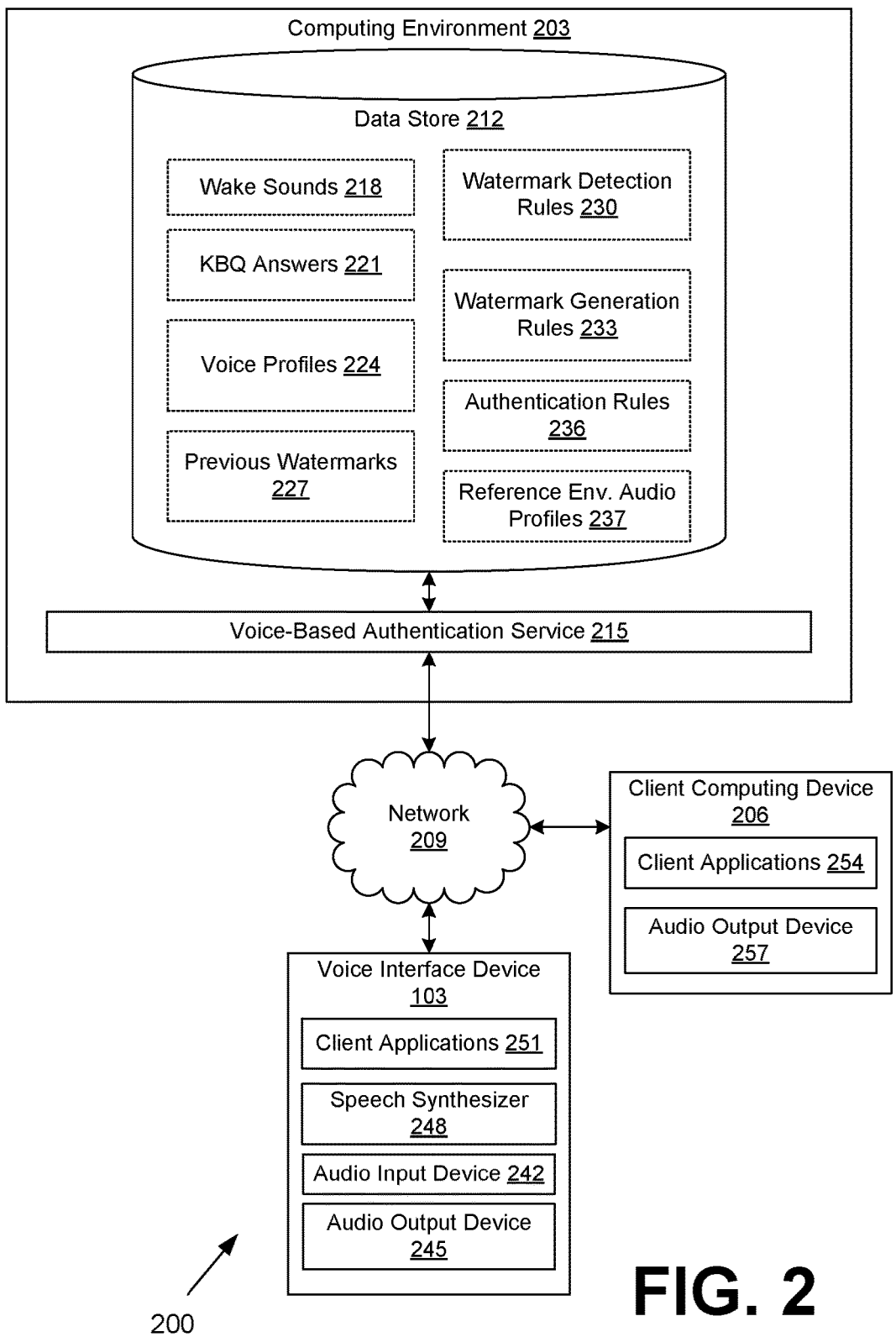
FIG. 2 is a schematic block diagram of a networked environment according to various embodiments of the present disclosure.

With reference to FIG. 2, shown is a networked environment 200 according to various embodiments. The networked environment 200 may include a computing environment 203, a client computing device 206, and a voice interface device 103, which are in data communication via a network 209. The network 209 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include a voice-based authentication service 215 and other applications, services, processes, systems, engines, or functionality not discussed in detail herein. The voice-based authentication service 215 is executed to receive voice authentication factors spoken by users and verify whether the voice authentication factors correspond to authorized users. The voice-based authentication service 215 may perform natural language processing on the voice authentication factor to identify what was spoken. Further, the voice-based authentication service 215 may also perform voice recognition to identify the person who spoke the voice authentication factor. Thus, the authentication performed by the voice-based authentication service 215 may include both determining whether secret content is spoken (e.g., a passphrase or an answer to a knowledge-based question) and determining whether the spoken content is in fact spoken by the authorized user.

In particular, the voice-based authentication service 215 is configured to detect replay-based attacks through "watermarking" of signals. When a user speaks a voice authentication factor, a unique watermark is played in the environment in which the user is speaking. Accordingly, the watermark should be captured by any surreptitious recording equipment that is recording at a relative fidelity that is high enough to accurately reproduce characteristics of the speaker's voice. If a past watermark (which may not be reused, in most cases) is presented again, the voice-based authentication service 215 is able to recognize that a replay-based attack has occurred and can reject authentication. In one embodiment, the watermark is played by the voice interface device 103. In another embodiment, the watermark is played by a client computing device 206 through which the authorized user has already authenticated in some respect (e.g., entering a code, fingerprint identification, facial recognition, etc.).

The data stored in the data store 212 includes, for example, wake sounds 218, knowledge-based question (KBQ) answers 221, voice profiles 224, previous watermarks 227, watermark detection rules 230, watermark generation rules 233, authentication rules 236, reference environmental audio profiles 237, and potentially other data. The wake sounds 218 are sounds that are configured to put the voice interface device 103, and by extension the voice-based authentication service 215, into active listening mode. The wake sounds 218 may include words, phrases, noises (e.g., three consecutive claps), or other sounds. Generally, the wake sounds 218 should be not something in normal conversation, so as to avoid waking the voice interface device 103 unnecessarily from sleep mode.

The KBQ answers 221 contain answers to questions that authorized users have preconfigured or otherwise should know. For instance, the KBQ answers 221 may contain the answer as to the user's mother's maiden name, the user's birthplace, the make of the user's first car, the user's favorite childhood teacher, and so on. The KBQ answers 221 may include answers to other questions such as when was the user's last purchase through the system, what item did the user order, and so forth.

The voice profiles 224 include data signatures or profiles of authorized users' voices. The voice profiles 224 may record a variety of characteristics relating to tone, pitch, frequency characteristics, speed, volume, and so on, for various sounds spoken by the users. The voice profiles 224 may be used to identify speakers of predetermined content and/or unknown content. In some embodiments, the voice interface device 103 may include multiple microphones, and the voice profiles 224 may profile the users' voices with reference to the audio typically captured by individual ones of the multiple microphones. For instance, if a voice interface device 103 is typically deployed in a corner of a room, microphones facing toward the room, as opposed to the walls, may capture a louder version of the voice. Thus, if the pattern of the voice as distributed among the multiple microphones changes beyond a threshold from what is usually expected, it may be that the voice is emanating from an unlikely area in the room. This may be a factor weighing against authentication of the user.

The previous watermarks 227 record characteristics of signals previously presented to watermark a voice authentication factor. In one embodiment, the previous watermarks 227 may be used once and never again. In another embodiment, the previous watermarks 227 may be reused but at a low frequency such that it would be unlikely that a current watermark would equal a previous watermark 227. The data store 212 may also store metadata in association with the previous watermarks 227, such as a timestamp, a geolocation, and so on, to enable investigation of replay attacks to determine when and where an authorized user was recorded.

The watermark detection rules 230 enable the voice-based authentication service 215 to detect previous watermarks 227 in audio corresponding to a voice authentication factor. The watermark detection rules 230 may specify the frequency, timing, or other content of the audio to be examined for a possible previous watermark 227. In addition, knowledge of a current watermark may be used to ignore or null out a current watermark in the audio.

The watermark generation rules 233 control the generation of current watermark signals to be presented when voice-based authentication is used. For example, the watermark generation rules 233 may control how previous watermarks 227 are to be avoided. In various embodiments, the watermark generation rules 233 may specify that the watermark signal should be ultrasonic, or above the range of hearing for a human (e.g., greater than 20 kilohertz), or the watermark generation rules 233 may indicate that the watermark signal should be in an audible frequency range.

If ultrasonic or near-ultrasonic, the watermark signal should be imperceptible or nearly imperceptible to a user. However, such watermark signals may not be strong enough to be picked up by any sound recorder (e.g., the frequency response of a microphone may not pick up such sounds well). Also, potential attackers may be able to remove watermark signals by way of a low-pass filter. Audible signals could be mixed with the speech, making it more difficult for the watermark signal to be removed. Nonetheless, audible signals in some embodiments may potentially be perceived as distracting or annoying.

In some embodiments, an echo of the current audio from the voice interface device 103 may be used as a watermark signal. The echo would be a delayed version of the audio captured by the voice interface device 103. The amount of delay and other parameters (e.g., pitch modulation, loudness modulation, turning the echo on or off, etc.) may be configurable to correspond to a specific watermark signal. For example, one watermark signal may delay 20 milliseconds, while another watermark signal may delay 30 milliseconds. The use of a modulated echo may be less objectionable than other audible watermark signals because it may resemble sidetone provided when speaking into a telephone. Other audible watermark signals may include seemingly randomized noises (e.g., pops, hisses, beeps, etc.), music content, or speech content.

In some cases, the watermark signal may be time based or location based. For example, the watermark signal may vary with the current time according to a predefined pattern or algorithm, potentially based upon a seed. As another example, the watermark signal may encode location information as reported by a global positioning system (GPS) device.

The authentication rules 236 control how the voice-based authentication service 215 performs authentication upon a voice authentication factor. In some cases, for additional assurance, the voice-based authentication service 215 may cause the user to be presented with a question to which the user (but not others) is likely to know the answer. Thus, the content as well as the speech itself may be authentication factors. In other cases, the speech itself may be an authentication factor. Merely saying a wake sound 218 and/or saying a command may be authenticated purely on the basis of recognition of the speaker. Where the voice interface device 103 includes multiple microphones, the distribution of the voice or environmental audio among the microphones may be a factor taken into account by the authentication rules 236. The prior consistency of the distribution may be used as a factor in determining a confidence score when an expected change is observed, where greater prior consistency results in a higher confidence if a change is observed.

It is noted that different approaches to watermarking may have differing degrees of entropy. That is to say, under one approach to watermarking, there may be 10,000 potential variations, while under another approach to watermarking, there may be only 100 potential variations. More potential variations may result in a system with greater entropy and trust, while fewer potential variations may result in a system with lower entropy and trust. Nonetheless, it may be the case that the approach involving 100 potential variations is more robust (e.g., a louder watermark signal that is not easily filtered out) and more likely to result in an attacker presenting a previous watermark signal during a replay attack. Thus, the authentication rules 236 may require a greater degree of security assurance if a low entropy or non-robust watermarking approach is used. When a greater degree of security assurance is required, the authentication rules 236 may limit authentication retries, reduce timeout thresholds, require the use of additional authentication factors, modify confidence thresholds, or take other steps to increase security assurance.

The reference environmental audio profiles 237 include characteristics of environmental or ambient audio captured when users provide voice commands to the voice interface device 103. The reference environmental audio profiles 237 may be established over many sessions of user interaction. Consequently, if a voice command is received with unexpected environmental audio, the voice command may be a replay attack performed in a different environment. However, lack of a match to the reference environmental audio profiles 237 may not be dispositive as to whether a replay attack is occurring, but may simply be a factor that increases confidence that a replay attack is occurring. Various approaches to using environmental audio to verify context in authentication are described in U.S. patent application Ser. No. 14/658,276, entitled "VERIFYING AUTHENTICITY OF MACHINE-READABLE IDENTIFIERS," and filed on Mar. 16, 2015, which is incorporated herein by reference in its entirety.

In some embodiments, the voice interface device 103 may include multiple microphones, and the reference environmental audio profiles 237 may profile the environmental audio with reference to the audio typically captured by individual ones of the multiple microphones. For instance, if a voice interface device 103 is typically deployed in a corner of a room, microphones facing toward the room, as opposed to the walls, may capture more sounds from the room. Thus, if the pattern of environmental audio as distributed among the multiple microphones changes, it may be that the voice interface device 103 has been moved or otherwise compromised by a malicious user.

The voice interface device 103 is representative of a plurality of client devices that may be coupled to the network 209. The voice interface device 103 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, or other devices. The voice interface device includes one or more audio input devices 242 and one or more audio output devices 245. The audio input devices 242 may comprise a microphone, a microphone-level audio input, a line-level audio input, or other types of input devices. The audio output device 245 may comprise a speaker, a speaker output, a headphone output, a line-level audio output, or other types of output devices. In one embodiment, the voice interface device 103 includes at least one integrated microphone and at least one integrated speaker, within a single enclosure.

The voice interface device 103 may also include a speech synthesizer 248 and one or more client applications 251. The speech synthesizer 248 may be configured to transform text inputs into speech for one or more languages using one or more standard voice profiles. The client applications 251 may enable functionality such as personal assistant functionality, home automation functionality, television control functionality, music playback functionality, and/or other interactive functions. The client applications 251 may be configured to perform natural language processing and/or speech to text functions. Although the functionality in FIG. 2 is described as being divided among a computing environment 203 and a voice interface device 103, in some embodiments, the voice-based authentication service 215 and/or the data from the data store 212 may be executed or stored locally by the voice interface device 103.

Additional examples of a voice interface device 103 may be found in U.S. patent application Ser. No. 14/456,620, entitled "VOICE APPLICATION ARCHITECTURE," filed on Aug. 11, 2014, which was published as U.S. Patent Application Publication 2016/0042748 on Feb. 11, 2016; and in U.S. patent application Ser. No. 14/107,931, entitled "ATTRIBUTE-BASED AUDIO CHANNEL ARBITRATION," filed on Dec. 16, 2016, which was published as U.S. Patent Application Publication 2015/0170665 on Jun. 18, 2015. Both applications and their respective publications are incorporated herein by reference in their entirety.

The client computing device 206 is representative of a plurality of client devices that may be coupled to the network 209. The client 209 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, or other devices.

The client computing device 206 may be configured to execute various applications such as a client application 254 and/or other applications. The client application 254 may be executed to authenticate a user, determine a current watermark signal based upon timing and a predetermined sequence or via coordination with the voice-based authentication service 215, and play the current watermark signal via an audio output device 257. The client computing device 206 may be configured to execute applications beyond the client application 254, such as, for example, email applications, social networking applications, word processors, spreadsheets, and/or other applications.

Figure 3A:
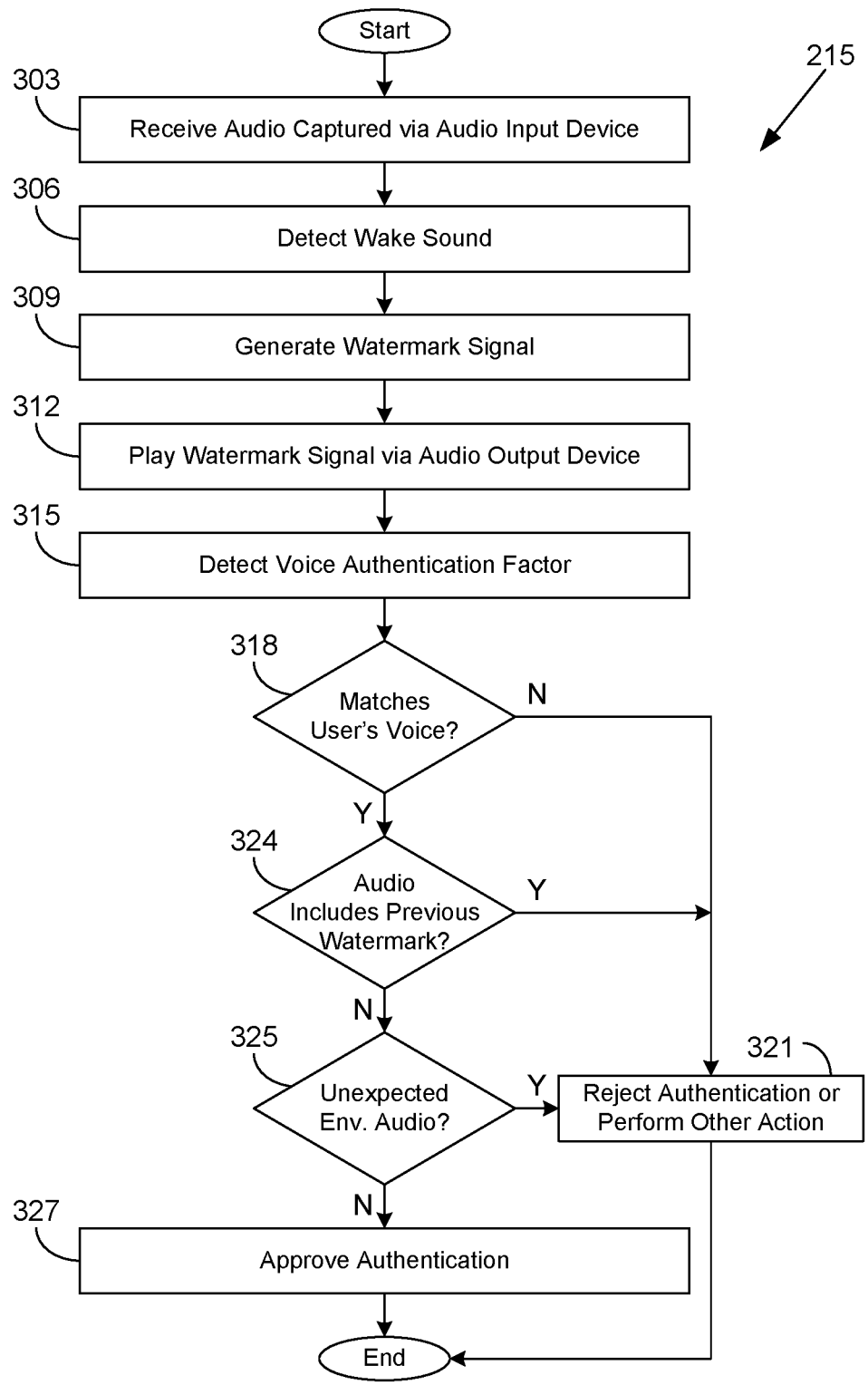
FIGS. 3A and 3B are flowcharts illustrating examples of functionality implemented as portions of voice-based authentication service executed in a computing environment in the networked environment of FIG. 2 according to various embodiments of the present disclosure.

Referring next to FIG. 3A, shown is a flowchart that provides one example of the operation of a portion of the voice-based authentication service 215 according to various embodiments. It is understood that the flowchart of FIG. 3A provides merely an example of the many different types of functional arrangements that may be employed to implement the operation of the portion of the voice-based authentication service 215 as described herein. As an alternative, the flowchart of FIG. 3A may be viewed as depicting an example of elements of a method implemented in the computing environment 203 (FIG. 2) according to one or more embodiments.

Beginning with box 303, the voice-based authentication service 215 receives audio captured from an audio input device 242 (FIG. 2) of a voice interface device 103 (FIG. 2). A client application 251 (FIG. 2) executed by the voice interface device 103 may encode the audio and stream the audio over the network 209 (FIG. 2) to the computing environment 203 for analysis by the voice-based authentication service 215. Alternatively, the voice-based authentication service 215, or portions thereof, may be executed locally by the voice interface device 103. The received audio may include audio captured separately through a plurality of audio input devices 242 of the voice input devices 103.

In box 306, the voice-based authentication service 215 detects a wake sound 218 (FIG. 2), which places the voice interface device 103 into an active listening mode. In box 309, in response to the wake sound 218, the voice-based authentication service 215 generates a watermark signal according to the watermark generation rules 233 (FIG. 2). The watermark signal may be an entirely new watermark signal on a per-device basis for the voice interface device 103 or on a per-user basis with the user identified according to the wake sound 218.

In box 312, the voice-based authentication service 215 causes the watermark signal to be played out via an audio output device 245 (FIG. 2) of the voice interface device 103. It is noted that the duration of the watermark signal may be modulated according to a pattern. For instance, the watermark signal may be generated two seconds on and two seconds off. The duration pattern modulation may be a characteristic of the watermark signal that can vary, thereby invalidating previous watermark signals with other durations or patterns. While the watermark signal is being played out, the voice interface device 103 continues capturing audio via the audio input device 242. Thus, the captured audio may also include the current watermark signal. In some cases, the voice interface device 103 may be configured to be playing watermark signals continuously.

In box 315, the voice-based authentication service 215 detects a voice authentication factor from the captured audio. For instance, the audio may contain a voice command for which authentication is required. In some cases, the voice-based authentication service 215 may cause a knowledge-based question to be asked via the speech synthesizer 248 (FIG. 2), where the user is prompted to supply a knowledge-based question answer 221 (FIG. 2).

In box 318, the voice-based authentication service 215 determines whether the voice authentication factor in the audio matches the voice of the authorized user. In this regard, the voice-based authentication service 215 may perform an analysis of the voice embodied in the voice authentication factor, to include speed of delivery, pitch, spectral content, loudness, orientation relative to multiple microphones of the voice interface device 103, and/or other characteristics. These characteristics can then be compared with the voice profile 224 (FIG. 2) of the authorized user to determine a confidence score. The confidence score is then compared to a threshold to determine whether a match has occurred.

If the voice authentication factor is determined not to match the authorized user's voice, the voice-based authentication service 215 moves from box 318 to box 321 and rejects the authentication or performs another action. For example, the voice-based authentication service 215 may cause the speech synthesizer 248 to respond to the user via the audio output device 245 with "access denied," "sorry, but I cannot do that for you," or some other type of response. In some cases, a user may be prompted to provide other authentication factors in order to verify his or her identity, such as answering knowledge-based questions, providing another voice sample, providing a valid fingerprint, presenting a one-time password from a hardware token, obtaining corroboration from another authorized user, and so forth. If a previous watermark signal is detected, a time associated with when the audio was originally created may be determined for further investigation.

Other actions that may be performed may include notifying an administrator, blacklisting a network address, disabling access to the user account, and so forth. In one embodiment, the voice-based authentication service 215 may configure the voice interface device 109 to enter a honeypot mode, where it appears to the attacker that authentication was successful, but the access available to the attacker are restricted. In the honeypot mode, access to fake resources may be provided, so that the attacker is encouraged to continue to interact with the voice interface device 109. Through the continued interaction, more information about the attacker can be determined and logged. In some cases, the voice interface device 109 can be configured to record continued audio, potentially capturing the attacker's own voice for further analysis. Thereafter, the operation of the portion of the voice-based authentication service 215 ends.

Otherwise, if the voice authentication factor is determined to match the authorized user's voice, the voice-based authentication service 215 continues from box 318 to box 324. In box 324, the voice-based authentication service 215 determines whether the captured audio includes a previous watermark 227 (FIG. 2) along with the voice authentication factor. In this regard, the voice-based authentication service 215 may perform an analysis on the captured audio for expected characteristics of the previous watermarks 227.

For example, where the previous watermarks 227 include ultrasonic signals, the voice-based authentication service 215 may analyze the content of the captured audio to determine whether tones greater than 20 kilohertz are present, and then also the characteristics of such tones. As another example, where the previous watermarks 227 include echoes, the voice-based authentication service 215 may determine whether an echo is present in the captured audio, and then also the characteristics of such echoes. The characteristics may include amount of delay, variation in delay, relative loudness, frequency or pitch shifting, and so on. The characteristics of the extracted potential watermarks are then compared with the characteristics of the previous watermarks 227.

In some cases, a confidence score may be determined based on the degree of match. The confidence score can then be compared to a threshold to assess whether a confident match is determined. If the audio includes a previous watermark 227, the voice-based authentication service 215 moves to box 321 and rejects the authentication or performs another action. Thereafter, the operation of the portion of the voice-based authentication service 215 ends.

If the captured audio does not include a previous watermark 227, the voice-based authentication service 215 continues from box 324 to box 325. In box 325, the voice-based authentication service 215 determines whether the captured audio includes unexpected environmental audio or audio unexpectedly distributed among the multiple audio input devices 242 of the voice interface device 103. This determination may be performed through comparison to reference environmental audio profiles 237 and/or voice profiles 224. If unexpected environmental audio is present, or if audio is unexpectedly distributed, the voice-based authentication service 215 may move to box 321 and reject the authentication and/or take other actions. Thereafter, the operation of the portion of the voice-based authentication service 215 ends.

However, the presence of unexpected environmental audio or an unexpected distribution of audio may merely be a factor that weighs toward a determination of a replay attack when other factors are not individually dispositive. Other factors that may be employed may be geolocation of the voice interface device 103 (e.g., the voice interface device 103 has a network address from a country never visited by the authorized user), whether different languages are spoken in the captured audio from those that are expected, whether background noise appears to have abrupt transitions, whether sounds in the speech have variations that are unexpected or abrupt (e.g., from a pieced together recording), whether the background noise for the voice authentication factor differs from the background noise present when capturing the wake sound 218, and so forth.

If the captured audio does not include unexpected ambient audio, the voice-based authentication service 215 continues from box 325 to box 327. In box 327, the voice-based authentication service 215 approves authentication of the user. Consequently, an action requested by the user in the voice authentication factor, or subsequent to the voice authentication factor, may be approved. Thereafter, the operation of the portion of the voice-based authentication service 215 ends.

In another embodiment, a replay attack may be detected based at least in part on information that the authorized user is at another geographic location. For example, if a user authenticates via fingerprint using a smartphone reporting his or her location as being at a first location, if the user gives a voice command at a second location, it may be that the voice command is replayed from a recording.

In yet another embodiment, a replay attack may be detected by storing audio of the user giving previous voice commands in the data store 212, and then comparing voice authentication factors to the stored audio. Since voice is likely to vary to at least some degree in intonation, pitch, delay, or other characteristics, detecting an exact copy of an earlier voice command may be indicative of a replay attack. The environmental audio may be disregarded or filtered out in order to make this comparison.

Figure 3B:
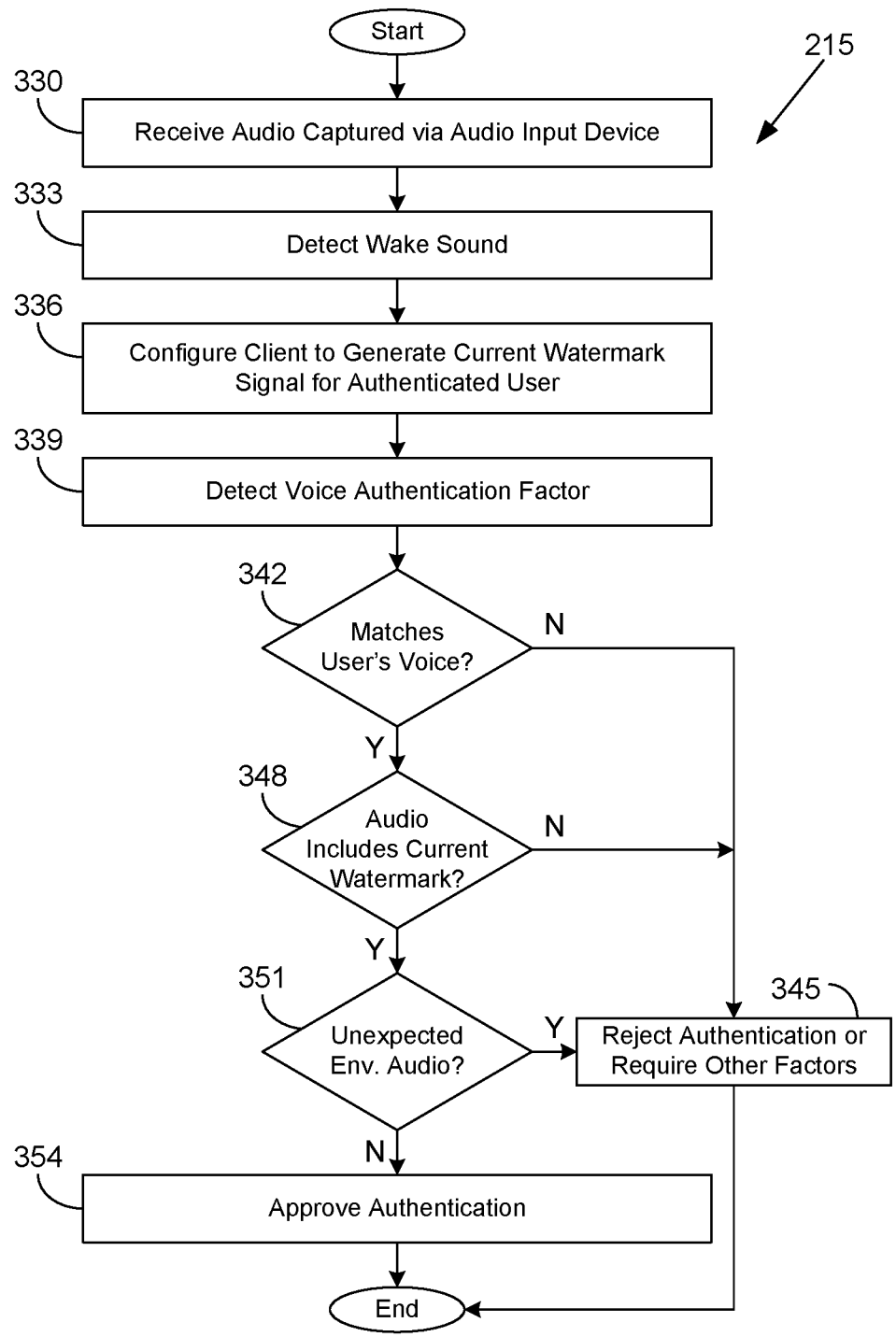

Turning now to FIG. 3B, shown is a flowchart that provides another example of the operation of a portion of the voice-based authentication service 215 according to various embodiments. It is understood that the flowchart of FIG. 3B provides merely an example of the many different types of functional arrangements that may be employed to implement the operation of the portion of the voice-based authentication service 215 as described herein. As an alternative, the flowchart of FIG. 3B may be viewed as depicting an example of elements of a method implemented in the computing environment 203 (FIG. 2) according to one or more embodiments.

Beginning with box 330, the voice-based authentication service 215 receives audio captured from an audio input device 242 (FIG. 2) of a voice interface device 103 (FIG. 2). A client application 251 (FIG. 2) executed by the voice interface device 103 may encode the audio and stream the audio over the network 209 (FIG. 2) to the computing environment 203 for analysis by the voice-based authentication service 215. Alternatively, the voice-based authentication service 215, or portions thereof, may be executed locally by the voice interface device 103. The received audio may include audio captured separately through a plurality of audio input devices 242 of the voice input devices 103.

In box 333, the voice-based authentication service 215 detects a wake sound 218 (FIG. 2), which places the voice interface device 103 into an active listening mode. In box 336, the voice-based authentication service 215 configured a client computing device 206 (FIG. 2) to generate a current watermark signal for an authenticated user. In some cases, the client computing device 206 may be preconfigured with the information necessary to generate a watermark signal. For instance, the client computing device 206 may generate a watermark signal based at least in part on a seed and a current time and/or location.

In box 339, the voice-based authentication service 215 detects a voice authentication factor from the captured audio. For instance, the audio may contain a voice command for which authentication is required. In some cases, the voice-based authentication service 215 may cause a knowledge-based question to be asked via the speech synthesizer 248 (FIG. 2), where the user is prompted to supply a knowledge-based question answer 221 (FIG. 2).

In box 342, the voice-based authentication service 215 determines whether the voice authentication factor in the audio matches the voice of the authorized user. In this regard, the voice-based authentication service 215 may perform an analysis of the voice embodied in the voice authentication factor, to include speed of delivery, pitch, spectral content, loudness, orientation relative to multiple microphones of the voice interface device 103, and/or other characteristics. These characteristics can then be compared with the voice profile 224 (FIG. 2) of the authorized user to determine a confidence score. The confidence score is then compared to a threshold to determine whether a match has occurred.

If the voice authentication factor is determined not to match the authorized user's voice, the voice-based authentication service 215 moves from box 342 to box 345 and rejects the authentication or performs another action. For example, the voice-based authentication service 215 may cause the speech synthesizer 248 to respond to the user via the audio output device 245 with "access denied," "sorry, but I cannot do that for you," or some other type of response. In some cases, a user may be prompted to provide other authentication factors in order to verify his or her identity, such as answering knowledge-based questions, providing another voice sample, providing a valid fingerprint, presenting a one-time password from a hardware token, obtaining corroboration from another authorized user, and so forth. If a previous watermark signal is detected, a time associated with when the audio was originally created may be determined for further investigation.

Other actions that may be performed may include notifying an administrator, blacklisting a network address, disabling access to the user account, and so forth. In one embodiment, the voice-based authentication service 215 may configure the voice interface device 109 to enter a honeypot mode, where it appears to the attacker that authentication was successful, but the access available to the attacker are restricted. In the honeypot mode, access to fake resources may be provided, so that the attacker is encouraged to continue to interact with the voice interface device 109. Through the continued interaction, more information about the attacker can be determined and logged. In some cases, the voice interface device 109 can be configured to record continued audio, potentially capturing the attacker's own voice for further analysis. Thereafter, the operation of the portion of the voice-based authentication service 215 ends.

Otherwise, if the voice authentication factor is determined to match the authorized user's voice, the voice-based authentication service 215 continues from box 342 to box 348. In box 348, the voice-based authentication service 215 determines whether the captured audio includes the current watermark signal along with the voice authentication factor. In this regard, the voice-based authentication service 215 may perform an analysis on the captured audio for expected characteristics of the current watermark signal.

For example, where the current watermark signal includes ultrasonic signals, the voice-based authentication service 215 may analyze the content of the captured audio to determine whether tones greater than 20 kilohertz are present, and then also the characteristics of such tones. As another example, where the current watermark signal includes echoes, the voice-based authentication service 215 may determine whether an echo is present in the captured audio, and then also the characteristics of such echoes. The characteristics may include amount of delay, variation in delay, relative loudness, frequency or pitch shifting, and so on. The characteristics of the extracted potential watermarks are then compared with the characteristics of the current watermark signal.

In some cases, a confidence score may be determined based on the degree of match. The confidence score can then be compared to a threshold to assess whether a confident match is determined. If the audio does not include the current watermark signal, the voice-based authentication service 215 moves to box 345 and rejects the authentication or performs another action. Thereafter, the operation of the portion of the voice-based authentication service 215 ends.

If the captured audio includes the current watermark signal, the voice-based authentication service 215 continues from box 348 to box 351. In box 351, the voice-based authentication service 215 determines whether the captured audio includes unexpected environmental audio or audio unexpectedly distributed among the multiple audio input devices 242 of the voice interface device 103. This determination may be performed through comparison to reference environmental audio profiles 237 and/or voice profiles 224. If unexpected environmental audio is present, or if audio is unexpectedly distributed, the voice-based authentication service 215 may move to box 345 and reject the authentication and/or take other actions. Thereafter, the operation of the portion of the voice-based authentication service 215 ends.

However, the presence of unexpected environmental audio or an unexpected distribution of audio may merely be a factor that weighs toward a determination of a replay attack when other factors are not individually dispositive. Other factors that may be employed may be geolocation of the voice interface device 103 (e.g., the voice interface device 103 has a network address from a country never visited by the authorized user), whether different languages are spoken in the captured audio from those that are expected, whether background noise appears to have abrupt transitions, whether sounds in the speech have variations that are unexpected or abrupt (e.g., from a pieced together recording), whether the background noise for the voice authentication factor differs from the background noise present when capturing the wake sound 218, and so forth.

If the captured audio does not include unexpected ambient audio, the voice-based authentication service 215 continues from box 351 to box 354. In box 354, the voice-based authentication service 215 approves authentication of the user. Consequently, an action requested by the user in the voice authentication factor, or subsequent to the voice authentication factor, may be approved. Thereafter, the operation of the portion of the voice-based authentication service 215 ends.

Figure 4:
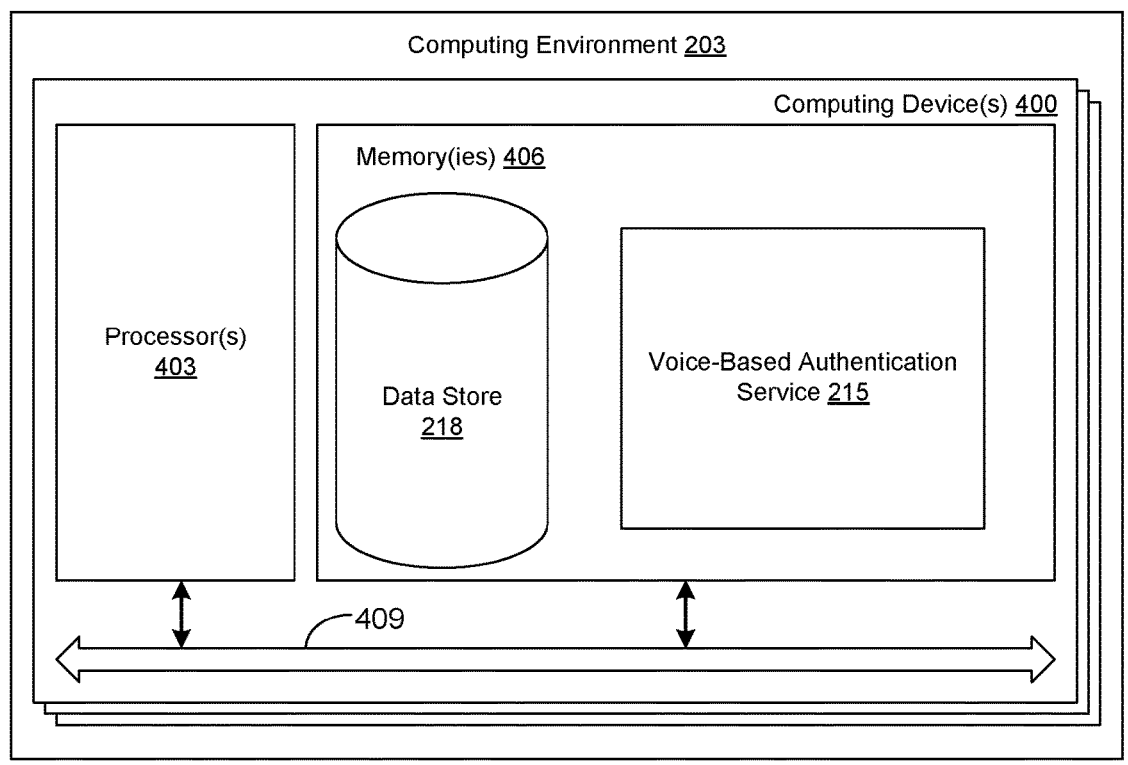
FIG. 4 is a schematic block diagram that provides one example illustration of a computing environment employed in the networked environment of FIG. 2 according to various embodiments of the present disclosure.

With reference to FIG. 4, shown is a schematic block diagram of the computing environment 203 according to an embodiment of the present disclosure. The computing environment 203 includes one or more computing devices 400. Each computing device 400 includes at least one processor circuit, for example, having a processor 403 and a memory 406, both of which are coupled to a local interface 409. To this end, each computing device 400 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are the voice-based authentication service 215 and potentially other applications. Also stored in the memory 406 may be a data store 212 and other data. In addition, an operating system may be stored in the memory 406 and executable by the processor 403.

It is understood that there may be other applications that are stored in the memory 406 and are executable by the processor 403 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and/or multiple processor cores and the memory 406 may represent multiple memories 406 that operate in parallel processing circuits, respectively. In such a case, the local interface 409 may be an appropriate network that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the voice-based authentication service 215 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3A and 3B show the functionality and operation of an implementation of portions of the voice-based authentication service 215. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowcharts of FIGS. 3A and 3B show a specific order of execution, it is understood that the order of execution may differ from that which is depicted. For example, the order of execution of two or more blocks may be scrambled relative to the order shown. Also, two or more blocks shown in succession in FIGS. 3A and 3B may be executed concurrently or with partial concurrence. Further, in some embodiments, one or more of the blocks shown in FIGS. 3A and 3B may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the voice-based authentication service 215, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the voice-based authentication service 215, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 400, or in multiple computing devices 400 in the same computing environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method, comprising:
   receiving, via at least one of one or more computing devices, audio captured via an audio input device at a first geographic location;
   verifying, via at least one of the one or more computing devices, that the audio includes a voice authentication factor spoken by a user;
   receiving, via at least one of the one or more computing devices, information indicating that the user is physically present at a second geographic location instead of the first geographic location when the audio was captured; and
   performing, via at least one of the one or more computing devices, at least one action in response to receiving the information, the at least one action comprising at least one of: causing a notification of authentication failure to be played by a speaker, requesting that the user provide another authentication factor, sending a notification to an administrator, blacklisting a network address, disabling access to an account associated with the user, storing the audio in a data store, or causing a honeypot mode to be entered by the one or more computing devices.

2. The method of claim 1, wherein the information includes a determination that the audio includes a voice in a language that differs from an expected language.

3. The method of claim 1, wherein the information includes a geolocation determination of the second geographic location.

4. The method of claim 3, wherein the second geographic location corresponds to a country never previously visited by the user.

5. The method of claim 1, further comprising determining, via at least one of the one or more computing devices, that the audio was replayed from a recording in response to receiving the information.

6. The method of claim 1, wherein receiving the information indicating that the user is physically present at the second geographic location comprises:
   receiving, via at least one of the one or more computing devices, other audio captured by a different audio input device at the second geographic location;
   determining, via at least one of the one or more computing devices, that the other audio captured by the different audio input device includes a voice of the user.

7. The method of claim 1, wherein receiving the information indicating that the user is physically present at the second geographic location comprises:
   determining, via at least one of the one or more computing devices, that a mobile device of the user physically located at the second geographic location; and
   determining, via at least one of the one or more computing devices, that the user has authenticated via a fingerprint using the mobile device at the second geographic location.

8. A method, comprising:
   receiving, via at least one of one or more computing devices, audio captured via an audio input device;
   verifying, via at least one of the one or more computing devices, that the audio includes a voice authentication factor spoken by a user;
   comparing, via at least one of the one or more computing devices, the audio with stored audio spoken by the user;
   determining, via at least one of the one or more computing devices, that an exact copy of the voice authentication factor from the audio is also in the stored audio; and
   performing, via at least one of the one or more computing devices, at least one action in response to determining that the exact copy of the voice authentication factor is in the stored audio, the at least one action comprising at least one of: causing a notification of authentication failure to be played by a speaker, requesting that the user provide another authentication factor, sending a notification to an administrator, blacklisting a network address, disabling access to an account associated with the user, storing the audio in a data store, or causing a honeypot mode to be entered by the one or more computing devices.

9. The method of claim 8, further comprising:
generating, via at least one of the one or more computing devices, a watermark signal; and
causing, via at least one of the one or more computing devices, the watermark signal to be played via an audio output device while the audio is being captured via the audio input device.

10. The method of claim 9, wherein the watermark signal is generated based at least in part on a time or a location.

11. The method of claim 9, further comprising storing, via at least one of the one or more computing devices, information about the watermark signal in the data store.

12. The method of claim 8, wherein determining that the exact copy of the voice authentication factor is in the stored audio further comprises determining, via at least one of the one or more computing devices, that the voice authentication factor does not vary from the stored audio by at least a threshold degree of at least one of: intonation, pitch, or delay.

13. The method claim 8, further comprising filtering out, via at least one of the one or more computing devices, environmental audio from the audio before comparing the audio with the stored audio spoken by the user.

14. The method claim 8, further comprising filtering out, via at least one of the one or more computing devices, a watermark signal from the audio.

15. A system, comprising:
at least one computing device; and
a voice-based authentication service executable in the at least one computing device, wherein when executed the voice-based authentication service causes the at least one computing device to at least:
receive audio captured via an audio input device;
verify that the audio includes a voice authentication factor spoken by a user;
detect a signal present in the audio indicating that the voice authentication factor is likely replayed from a recording; and
perform at least one action in response to detecting the signal, the at least one action comprising at least one of: causing a notification of authentication failure to be played by a speaker, requesting that the user provide another authentication factor, sending a notification to an administrator, blacklisting a network address, disabling access to an account associated with the user, storing the audio in a data store, or causing a honeypot mode to be entered by the one or more computing devices.

16. The system of claim 15, wherein the signal comprises a voice in a language that differs from an expected language.

17. The system of claim 15, wherein the signal comprises an abrupt transition in background audio.

18. The system of claim 15, wherein the signal comprises an unexpected variation in speech spoken by the user.

19. The system of claim 15, wherein the signal comprises a previous watermark signal.

20. The system of claim 15, wherein detecting the signal present in the audio indicating that the voice authentication factor is likely replayed from the recording further comprises evaluating a combination of a plurality of factors relating to the signal.

* * * * *